(12) United States Patent
Sun

(10) Patent No.: US 11,185,771 B2
(45) Date of Patent: Nov. 30, 2021

(54) ACCESSORY SWITCH METHOD AND APPARATUS IN VIRTUAL ENVIRONMENT, DEVICE, AND STORAGE MEDIUM

(71) Applicant: TENCENT TECHNOLOGY (SHENZHEN) COMPANY LIMITED, Guangdong (CN)

(72) Inventor: Da Jia Sun, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/928,408

(22) Filed: Jul. 14, 2020

(65) Prior Publication Data

US 2020/0360806 A1 Nov. 19, 2020

Related U.S. Application Data

(63) Continuation of application No. PCT/CN2019/082742, filed on Apr. 15, 2019.

(30) Foreign Application Priority Data

May 9, 2018 (CN) .......................... 201810437777.2

(51) Int. Cl.
*A63F 13/426* (2014.01)
*A63F 13/52* (2014.01)
*A63F 13/837* (2014.01)

(52) U.S. Cl.
CPC ............ *A63F 13/426* (2014.09); *A63F 13/52* (2014.09); *A63F 13/837* (2014.09); *A63F 2300/308* (2013.01); *A63F 2300/6045* (2013.01); *A63F 2300/8076* (2013.01)

(58) Field of Classification Search
CPC ........ A63F 13/42; A63F 13/426; A63F 13/52; A63F 13/53; A63F 13/837; A63F 2300/308; A63F 2300/6045
See application file for complete search history.

(56) References Cited

U.S. PATENT DOCUMENTS

2019/0192971 A1\* 6/2019 Eatedali ................ A63F 13/798

OTHER PUBLICATIONS

Call of Duty: Blacks Ops II by Activision, first published in Nov. 2012 (Year: 2012).\*
Wiki article, Call of Duty: Black Ops II, available online: https://en.wikipedia.org/wiki/Call_of_Duty:_Black_Ops_II (Year: 2021).\*

(Continued)

*Primary Examiner* — James S. McClellan
(74) *Attorney, Agent, or Firm* — Sughrue Mion, PLLC

(57) ABSTRACT

An attachment switching method, apparatus and a storage medium are provided. The method includes displaying, by the terminal, a first interface, the first interface including an image of the virtual environment observed by a virtual object, the virtual object holding a virtual gun, and a primary slot of the virtual gun being equipped with a first attachment; receiving, by the terminal, an attachment switching operation; and switching, by the terminal, the first attachment in the primary slot to a second attachment in a secondary slot according to the attachment switching operation, the primary slot and the secondary slot being the same type of gun attachment slots of the virtual gun.

18 Claims, 7 Drawing Sheets

(56) References Cited

OTHER PUBLICATIONS

YouTube video My Controls & Settings in Black Ops 2—Superior Sound Settings by IncredibleOrb dated Dec. 3, 2012, available online: https://www.youtube.com/watch?v=wEBjRyVH_M (Year: 2012).*

YouTube video Blacks Ops 2 Weapons Attachments by Chris Spooner on Aug. 27, 2012, available online: https://www.youtube.com/watch?v=ebN-8406wmU (Year: 2012).*

Online article Call of Duty Blacks Ops 2 Review by Jason Mathes on Apr. 23, 2013, available online: https://www.dragonblogger.com/call-of-duty-black-ops-2-review/ (Year: 2013).*

YouTube video Black Ops 2 : How to Play in 3rd Person Mode ! ( NEW Method ) by TheStig23100 on Aug. 15, 2013, available online: https://www.youtube.com/watch?v=iiTfYmjmbxg (Year: 2013).*

YouTube video Black Ops 2 | Pick Up Guns Almost Instantly? (Quick Tips) by TheXclusiveAce on Jan. 7, 2013, available online: https://www.youtube.com/watch?v=ge64j_2Yvn4 (Year: 2013).*

International Search Report of PCT/CN2019/082742 dated Jul. 11, 2019 [PCT/ISA/210].

Written Opinion of PCT/CN2019/082742 dated Jul. 11, 2019 [PCT/ISA/237].

Office Action dated Sep. 2, 2021 in Chinese Application No. 201810437777.2

"Tencent Photonics Studio", Severe Life: Simulating Battlefield YAhaha, Jaha, YAhaha, 2018, https://www.bilibili.com/video/BV14W411Jiv? (15 pages total).

"How can the 2 sights mounted on the firearm be switched after the gun can be changed?", NikoBBC, https:tieba.baidu.com/p/4022612349? Red_tag = 000874499, body page 1, Sep. 1, 2015 (2 pages total).

"Chinese Version Flash CS6 Game Prodduction Full Instance", Strict Ed., pp. 246-247, Beijing: Ocean Press, Apr. 2014 (6 pages total).

* cited by examiner

ACCESSORY SWITCH METHOD AND APPARATUS IN VIRTUAL ENVIRONMENT, DEVICE, AND STORAGE MEDIUM

CROSS-REFERENCE TO RELATED APPLICATION(S)

This application is a continuation of PCT/CN2019/082742 filed on Apr. 15, 2019, and claims priority to Chinese Patent Application No. 201810437777.2, entitled "ACCESSORY SWITCH METHOD IN VIRTUAL ENVIRONMENT, DEVICE, AND STORAGE MEDIUM," filed with the China Patent Office on May 9, 2018, which is incorporated by reference herein in their entireties.

BACKGROUND

1. Field

Embodiments of this disclosure relate to the field of virtual environments, and in particular, to an attachment switching method and apparatus in a virtual environment, a device, and a storage medium.

2. Description of Related Art

Terminal devices such as a smartphone and a tablet computer are provided with many application programs based on a virtual environment, for example, a virtual reality application program, a three-dimensional map program, a military simulation program, a third-person shooting (TPS) game, a first-person shooting (FPS) game, and a multiplayer online battle arena (MOBA) game. In the foregoing application programs, a user may control a first virtual object to use a virtual gun to shoot at a virtual item or another virtual object located in a virtual environment.

Generally, a virtual gun is provided with some slots, and the slots are used for assembling different gun attachments. For example, an M416 automatic rifle is generally provided with a muzzle slot, a grip slot, a magazine slot, a stock slot, and a sight slot, where the sight slot may be equipped with any one of a red dot sight, a holographic sight, a 2× sight, a 4× sight, and an 8× sight. In a case that a player holds the M416 automatic rifle and aims down the sight, the virtual environment may be magnified to a specific extent for observation according to the sight assembled in the gun. For example, in a case that the M416 automatic rifle is equipped with a 4× sight, the player can observe the virtual environment that is magnified by about 4 times when aiming down the sight. In a case that the player intends to switch the sight in the sight slot of the gun, the player needs to open a virtual backpack and drags a to-be-switched sight in the virtual backpack to a location of the sight slot, to complete the switching of the sight in the sight slot.

SUMMARY

According to various embodiments of the disclosure, an attachment switching method, a device, and a storage medium are provided.

According to an embodiment, there is provided an attachment switching method in a virtual environment, performed by a terminal, the method including: displaying, by the terminal, a first interface, the first interface including an image of the virtual environment observed by a virtual object, the virtual object holding a virtual gun, and a primary slot of the virtual gun being equipped with a first attachment; receiving, by the terminal, an attachment switching operation; and switching, by the terminal, the first attachment in the primary slot to a second attachment in a secondary slot according to the attachment switching operation, the primary slot and the secondary slot being the same type of gun attachment slots of the virtual gun.

According to an embodiment, there is provided an attachment switching apparatus including at least one memory storing computer program code and at least one processor configured to access the computer program and operate as instructed by the computer program code. The computer program code including: display code configured to cause the at least one processor to display a first interface, the first interface comprising an image of a virtual environment observed by a virtual object, the virtual object holding a virtual gun, and a primary slot of the virtual gun being equipped with a first attachment; receiving code configured to cause the at least one processor to receive an attachment switching operation; and switching code configured to cause the at least one processor to switch the first attachment in the primary slot to a second attachment in a secondary slot according to the attachment switching operation, the primary slot and the secondary slot being the same type of gun attachment slots of the virtual gun.

According to an embodiment, there is provided a non-transitory computer readable storage medium storing computer-readable code, the computer-readable code, when executed by one or more processors, causes the one or more processors to: display a first interface, the first interface comprising an image of a virtual environment observed by a virtual object, the virtual object holding a virtual gun, and a primary slot of the virtual gun being equipped with a first attachment; receive an attachment switching operation; and switch the first attachment in the primary slot to a second attachment in a secondary slot according to the attachment switching operation, the primary slot and the secondary slot being the same type of gun attachment slots of the virtual gun.

BRIEF DESCRIPTION OF THE DRAWINGS

The following description briefly introduces the accompanying drawings, which illustrate example embodiments of the disclosure. These and other aspects, features and advantages will become apparent from the following detailed description of example embodiments, which is to be read in conjunction with the accompanying drawings, in which.

DETAILED DESCRIPTION

Figure 1:
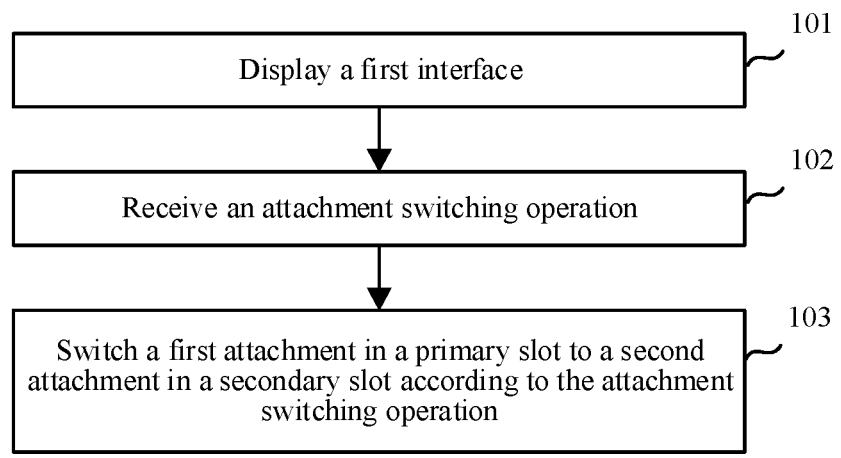
FIG. 1 is a flowchart of an attachment switching method in a virtual environment according to an embodiment.

To make the objectives, technical solutions, and advantages of the disclosure clearer and more understandable, embodiments of the disclosure are described in detail below with reference to the accompanying drawings. It is to be understood that specific embodiments described herein are only used as example embodiments, and are not intended to limit the scope of this disclosure.

First, the following explains several terms with respect to the embodiments described herein.

Virtual environment: an environment displayed (or provided) by an application on a terminal device. The virtual environment may be a simulated environment of a real world, or may be a semi-simulated, semi-fictional three-dimensional environment, or may be an entirely fictional three-dimensional environment. The virtual environment may be any one of a two-dimensional virtual environment, a 2.5-dimensional virtual environment, and a three-dimensional virtual environment, description is made by using an example in which the virtual environment is a three-dimensional virtual environment in the following embodiment, but the virtual environment is not limited thereto. In some embodiments, the virtual environment may include a virtual environment battle between at least two virtual objects. In some embodiments, the virtual environment may include a battle performed between at least two virtual objects by using virtual weapons. In some embodiments, the virtual environment may include a battle performed between at least two virtual objects by using virtual guns in a range of a target region, in which the range of the target region continuously decreases with the passage of time in the virtual environment.

A virtual object may be a movable object in a virtual environment. The movable object may be at least one of a virtual character, a virtual animal, and a cartoon character. In some embodiments, in a case that the virtual environment is a three-dimensional virtual environment, the virtual object is a three-dimensional model created based on a skeletal animation technology. Each virtual object has a shape and a volume in the three-dimensional virtual environment, and occupies some space in the three-dimensional virtual environment.

A virtual gun may be a virtual weapon that attacks virtual objects by shooting bullets in a virtual environment. A virtual object may pick up the virtual gun in the virtual environment, and attack by using the picked-up virtual gun. In some embodiments, each virtual gun may be provided with at least one slot, and each slot is used for assembling at least one gun attachment. For example, an M416 automatic rifle is generally provided with a muzzle slot, a grip slot, a magazine slot, a stock slot, and a sight slot, where the sight slot may be equipped with any one of a red dot sight, a holographic sight, a 2× sight, a 4× sight, and an 8× sight. In a case that a player holds the M416 automatic rifle and aims down the sight, the virtual environment may be magnified to a specific extent for observation according to the sight assembled in the gun.

A primary slot may refer to a slot in which a primary gun attachment is assembled when a virtual gun is located and a secondary slot may refer to a slot in which a secondary gun attachment is assembled when the virtual gun is located. The primary slot and the secondary slot may be the same type of attachment slots in the virtual gun. In some embodiments, a type of the attachment slot includes at least one of a muzzle attachment slot, a stock attachment slot, a sight slot, and a magazine slot. For example, if a gun attachment in the primary slot is a 4× sight, the gun attachment adopted when using the virtual gun is the 4× sight, and if a gun attachment in the secondary slot is a red dot sight, after the player performs an attachment switching operation, the red dot sight is switched to the primary slot.

Gun attachments may be divided into different types, such as a grip, a muzzle, a sight, and a stock, where each type of gun attachments is subdivided into different models. For example, the grip includes a vertical grip, an angled grip, a half grip, a light grip, and a thumb grip, the muzzle includes a muzzle compensator, a flash hider, and a suppressor, and the sight includes a red dot sight, a holographic sight, a 2× sight, a 4× sight, an 8× sight, and the like. The gun attachments assembled in the primary slot and the secondary slot may be the same type of gun attachments.

The terminal device may be a desktop computer, a portable laptop computer, a mobile phone, a tablet computer, an E-book reader, a moving picture experts group audio layer III (MP3) player, a moving picture experts group audio layer IV (MP4) player, or the like. An application program supporting a virtual environment may be installed and operate on the terminal, such as an application program supporting a three-dimensional virtual environment. The application program may be any one of a virtual reality application program, a three-dimensional map program, a military simulation program, a TPS game, an FPS game, and a MOBA game.

FIG. 1 is a flowchart of an attachment switching method in a virtual environment according to an embodiment. The method may be performed by a terminal or a server. In this embodiment, description is made by using an example in which the method is performed by a terminal, and the attachment switching method in a virtual environment includes the following steps.

In Step 101, the method may include displaying a first interface on a terminal device.

In some embodiments, the first interface includes a picture of the virtual environment observed by a virtual object, the virtual object holds a virtual gun, and a primary slot of the virtual gun is equipped with a first attachment.

In some embodiments, the virtual gun held by the virtual object may be directly obtained by using the virtual object to observe in the first interface. For example, one hand of the virtual object holds the virtual gun, and the first attachment is displayed on the virtual gun. Alternatively, the virtual gun may be obtained by observing a gun status bar displayed in the first interface, for example, the virtual gun is displayed in the gun status bar, and the first attachment is displayed corresponding to the virtual gun.

In some embodiments, the virtual gun held by the virtual object may not be obtained by using the virtual object to observe in the first interface. For example, the virtual object and the virtual gun are not displayed in the first interface, but the virtual gun may be obtained by observing the gun status bar displayed in the first interface.

In some embodiments, the virtual gun held by the virtual object can be directly obtained by using the virtual object to observe in the first interface, but the gun status bar is not displayed in the first interface, so that the virtual gun cannot be obtained by observing the gun status bar. However, an observation manner of the virtual gun is not limited hereto.

In some embodiments, the first interface is an interface displayed by using a first-person viewing angle of the virtual object, or may be an interface displayed by using a third-person viewing angle of the virtual object. The first-person viewing angle is a viewing angle corresponding to an image of the virtual environment that can be observed by the virtual object in the virtual environment. Here, the image corresponding to the first-person viewing angle may only include a part of the virtual object, for example, only arms of the virtual object and the virtual gun may be included in the first-person view. The third-person viewing angle is a viewing angle used by a camera model for observing the virtual object in the virtual environment. The interface corresponding to the third-person viewing angle includes the virtual object, and generally the camera model is located behind the virtual object to observe the virtual object, for example, a three-dimensional model of the virtual object and the virtual gun held by the virtual object can be observed.

Figure 2:
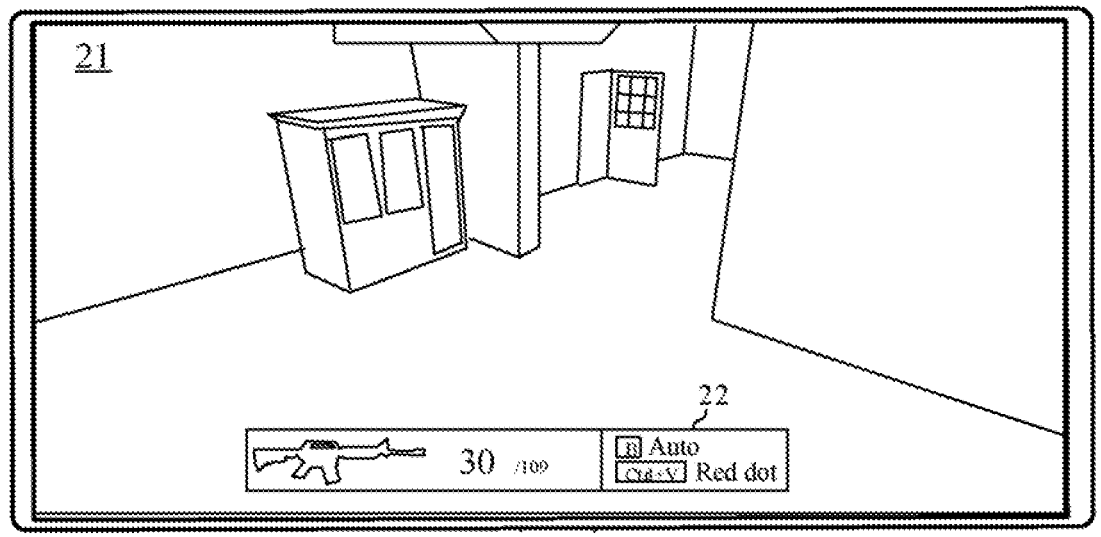
FIG. 2 is a schematic diagram of an interface of a terminal according to an embodiment.

In some embodiments, when the first interface is displayed by using the first-person viewing angle or the third-person viewing angle of the virtual object, the first interface further includes a gun status bar, and a first attachment assembled in the virtual gun is displayed in the gun status bar. For example, FIG. 2 is a schematic interface diagram of a first interface 21 of the first-person viewing angle of the virtual object. Here, the first interface 21 includes a gun status bar 22, and the gun status bar 22 displays a first attachment "red dot" assembled in the virtual gun, namely, a red dot sight.

Figure 3:
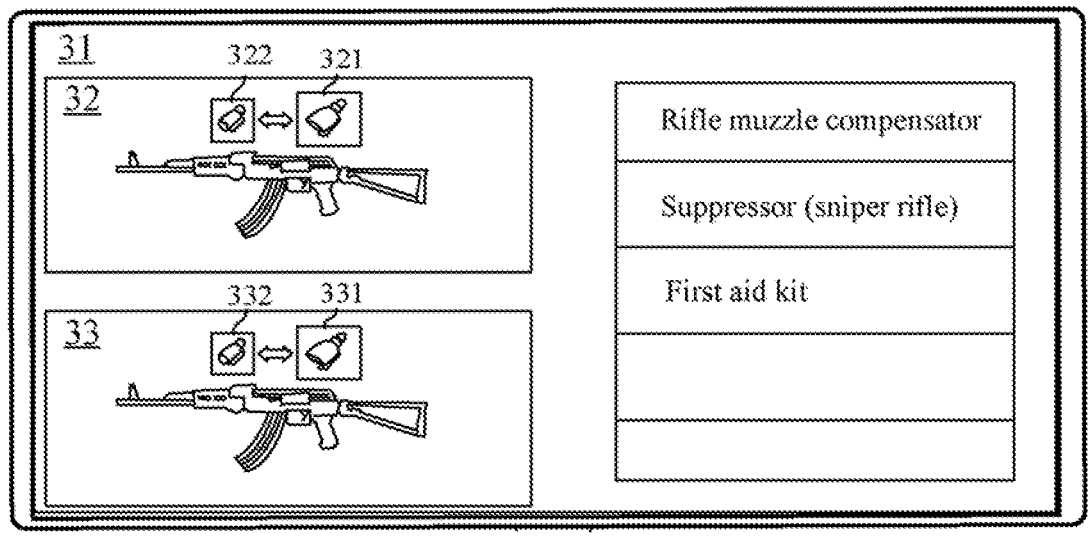
FIG. 3 is a schematic diagram of an interface of a terminal according to another embodiment.

In some embodiments, when the first interface is displayed in the first-person viewing angle or the third-person viewing angle of the virtual object, the first interface may further include a backpack control, a shortcut key operation that may be used to trigger opening of the backpack, and an assembled situation of the virtual gun that is displayed in the backpack. As shown in FIG. 3, after opening the backpack, an assembled situation of a virtual gun 32 and an assembled situation of a virtual gun 33 are displayed in a backpack 31, where a primary slot of the virtual gun 32 is equipped with a first attachment 321, a secondary slot of the virtual gun 32 is equipped with a gun attachment 322. In addition, a primary slot of the virtual gun 33 is equipped with a gun attachment 331, and a secondary slot of the virtual gun 33 is equipped with a gun attachment 332. Here, a display box of the primary slot may be larger than a display box of the secondary slot.

In some embodiments, when the first interface is displayed in the third-person viewing angle of the virtual object, the first interface further includes the virtual gun and an assembled first attachment displayed on the virtual gun.

In Step 102, the method may include receiving an attachment switching operation.

In some embodiments, a manner for receiving the attachment switching operation includes at least one of the following manners.

First, the terminal receives a shortcut key operating signal and determines that the attachment switching operation is received in a case that a shortcut key combination corresponding to the shortcut key operating signal is a target shortcut key combination.

When the terminal is a desktop computer or a laptop computer, the shortcut key operating signal may be triggered by an input operation of an external input device. For example, a shortcut key signal may be triggered by inputting Ctrl+V by using a keyboard; and when the terminal is a mobile terminal such as a mobile phone or a tablet computer, the shortcut key operating signal may be triggered by triggering a physical key on the mobile terminal, or may be triggered by an input operation of a virtual keyboard displayed on a touch screen.

Second, the terminal determines that the attachment switching operation is received in a case that the first interface includes an attachment switching control and receives a touch signal on the attachment switching control.

When the terminal device includes a touch display screen, the attachment switching operation may be alternatively determined by touching the attachment switching control on the touch display screen.

In Step 103, the method may include switching a first attachment in a primary slot to a second attachment in a secondary slot according to the attachment switching operation.

In some embodiments, the primary slot and the secondary slot are the same type of gun attachment slots of the virtual gun. For example, the primary slot and the secondary slot are both sight slots. As another example, the primary slot and the secondary slot are both muzzle attachment slots. As yet another example, the primary slot and the secondary slot are both stock attachment slots.

In some embodiments, the first attachment and the second attachment are the same type of gun attachments.

In some embodiments, a manner in which the terminal switches the first attachment in the primary slot to the second attachment in the secondary slot according to the attachment switching operation includes any one of the following manners.

First, the first attachment corresponds to a first attachment identifier, the second attachment corresponds to a second attachment identifier. When switching the first attachment in the primary slot to the secondary slot, the terminal modifies an attachment identifier corresponding to the primary slot from the first attachment identifier to the second attachment identifier.

Second, each slot has a flag bit corresponding to each gun attachment, and the flag bit is used for indicating whether the gun attachment is assembled in the slot. For example, 00 indicates that the gun attachment is assembled in a slot, and 01 indicates that the gun attachment is not assembled in a slot. If a flag bit in the primary slot and corresponding to the first attachment is 00, it indicates that the first attachment is assembled in the primary slot, and if a flag bit in the secondary slot and corresponding to the first attachment is 01, it indicates that the first attachment is not assembled in the secondary slot. The terminal device reads a gun attachment of which a flag bit in the secondary slot is 00 as the second attachment, changes a flag bit in the primary slot corresponding to the second attachment from 01 to 00, and then changes a flag bit in the secondary slot and corresponding to the second attachment from 00 to 01.

Based on the foregoing, according to the attachment switching method in a virtual environment provided in this embodiment, a primary slot and a secondary slot are disposed on a virtual gun, and an attachment in the secondary slot is switched to the primary slot according to an attachment switching operation, so that the switching between gun attachments is completed through relatively few operations. In this way, the player does not need to open a virtual backpack, and assemble a gun attachment in the virtual backpack to a slot to replace an original gun attachment in the slot, thereby simplifying the steps of attachment switching and improving the efficiency of human-computer interaction.

Figure 4:
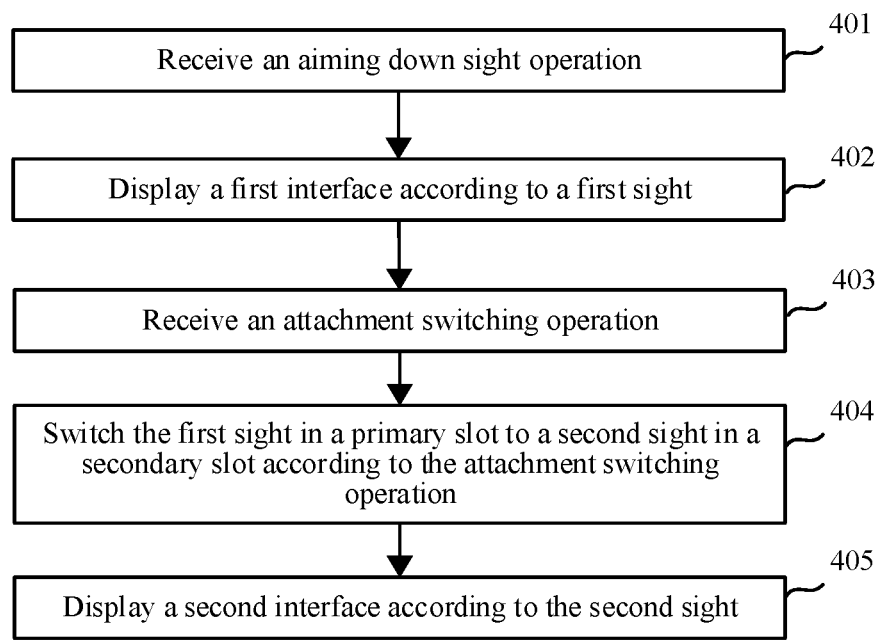
FIG. 4 is a flowchart of an attachment switching method in a virtual environment according to another embodiment.

In an another embodiment based on FIG. 1, the primary slot and the secondary slot are slots used for assembling a sight, where the first attachment is a first sight, and the second attachment is a second sight. FIG. 4 is a flowchart of an attachment switching method in a virtual environment according to another embodiment. In this embodiment, description is made by using an example in which the method is applied to a terminal, and the attachment switching method in a virtual environment includes the following steps.

In Step 401, the method may include receiving an aiming down sight operation by a terminal device.

In some embodiments, since the virtual gun is equipped with the first sight, the aiming down sight operation is used for observing the virtual environment through the first sight in the primary slot.

In some embodiments, the aiming down sight operation may be implemented by using an external device to input a shortcut key, or may be implemented by tapping or touching an aiming down sight control. However, this is not limited hereto.

In Step 402, the method may include displaying a first interface according to a first sight.

The first interface includes a virtual environment that is magnified according to a magnification factor of the first sight, and the first interface includes an image of the virtual environment that is magnified according to the magnification factor of the first sight.

In some embodiments, the virtual environment may be magnified according to the magnification factor of the first sight and may be displayed in the first interface in a full-screen, or may be displayed in a partial region of the first interface, and a part other than the partial region in the first interface may display the virtual environment that is not magnified. In some embodiments, the partial region is a viewing region of a lens of the sight.

In Step 403, the method may include receiving an attachment switching operation.

In some embodiments, a manner in which the terminal receives the attachment switching operation includes at least one of the following manners.

First, the terminal receives a shortcut key operating signal and determines that the attachment switching operation is received in a case that a shortcut key combination corresponding to the shortcut key operating signal is a target shortcut key combination.

When the terminal is a desktop computer or a laptop computer, the shortcut key operating signal may be triggered by an input operation of an external device. For example, a shortcut key signal is triggered by inputting Ctrl+V by using a keyboard; and when the terminal is a mobile terminal such as a mobile phone, the shortcut key operating signal may be triggered by pressing or touching a physical key on the mobile terminal, or may be triggered by an input operation of a virtual keyboard on a touch screen in the terminal.

Second, the terminal determines that the first interface includes an attachment switching control and receives a touch signal on the attachment switching control.

When the terminal is a terminal with a touch display screen, the attachment switching operation may be alternatively determined by touching the attachment switching control on the touch display screen.

In Step 404, the method may include switching the first sight in a primary slot to a second sight in a secondary slot according to the attachment switching operation.

In some embodiments, the primary slot and the secondary slot are both assistant sight slots of the virtual gun. After the terminal receives the attachment switching operation, the terminal assembles the second sight that is originally assembled in the secondary slot to the primary slot.

In some embodiments, the terminal may also assembles the first sight that is originally assembled in the primary slot to the secondary slot at the same time. In some other embodiments, the terminal may put the first sight into the backpack. In some other embodiments, the terminal may discard the first sight.

In Step 405, the method may include displaying a second interface according to the second sight.

In some embodiments, after the terminal receives the attachment switching operation, the terminal displays a second interface, where the second interface includes an image of the virtual environment observed by a virtual object, the virtual object holds a virtual gun, and the primary slot of the virtual gun is equipped with the second attachment.

In this embodiment, the second attachment is the second sight, and the second interface includes a virtual environment that is magnified according to a magnification of the second sight and displayed.

Figure 5:
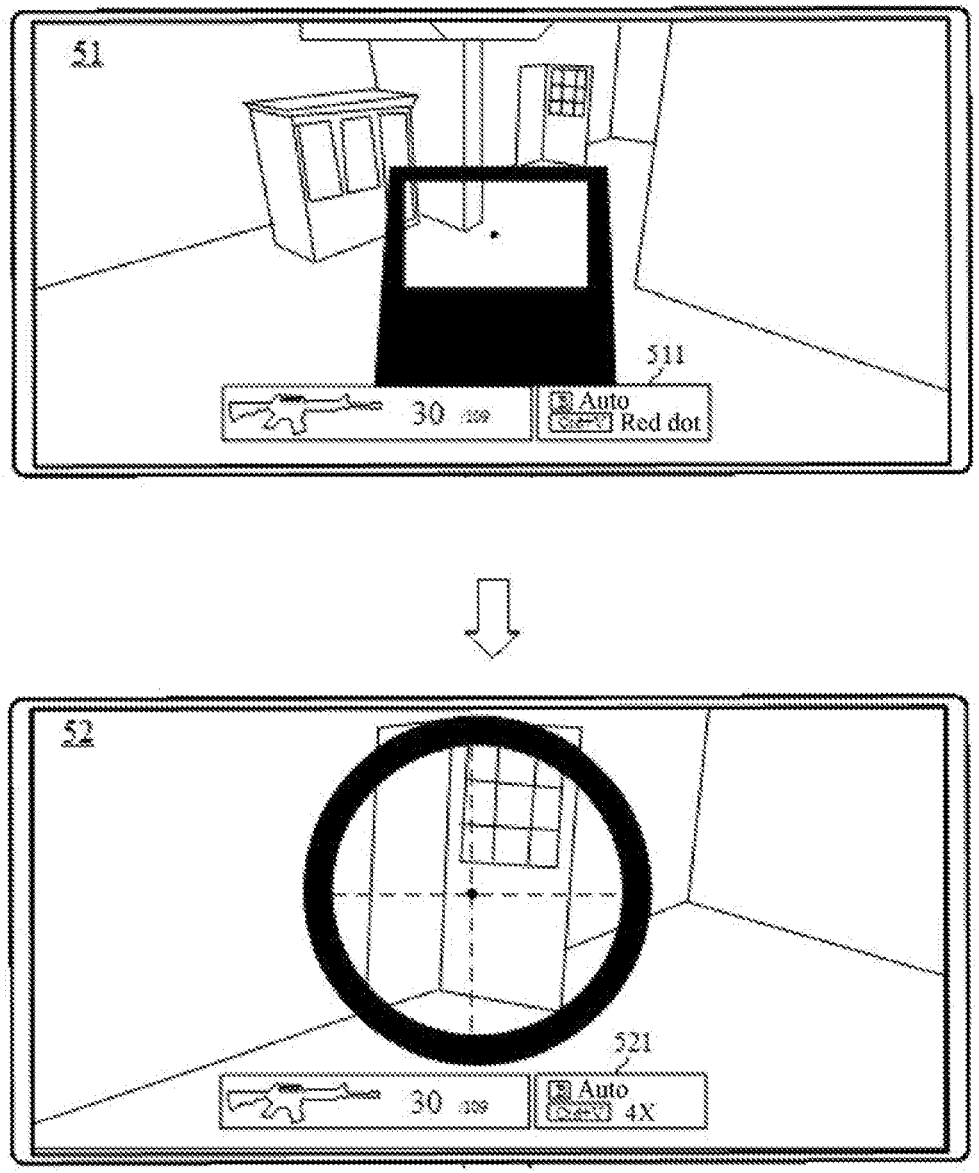
FIG. 5 is a schematic diagram of an interface of a terminal according to another embodiment.

For example, referring to FIG. 5, the terminal first displays a first interface 51 after receiving an aiming down sight operation. It is shown that, according to a gun status bar 511, the first interface 51 includes a virtual environment that may be magnified according to a magnification of a red dot sight, and the magnification is not performed in the first interface 51 as the red dot sight does not indicate any magnification factor. A second interface 52 is displayed after the attachment switching operation is received through the shortcut key "Ctrl+V". It is shown that, according to a gun status bar 521, the second interface 52 includes a virtual environment that is magnified according to a magnification factor of four times with respect to the first interface 51 (e.g., 4× sight). Here, the gun status bar 521 is changed from "Red dot" to "4×" to indicate that the virtual environment is magnified by the factor of 4.

In the foregoing embodiment, description is made by using an example in which the first interface and the second interface are both in a state of aiming down sight. In some embodiments, description may be alternatively made by using an example in which the first interface is in a state of aiming down sight, and the second interface is in a state of not aiming down sight. In some embodiments, the first interface is in a state of not aiming down sight, and the second interface is in a state of aiming down sight. However, this is not limited thereto.

According to the attachment switching method in a virtual environment provided in this embodiment, a primary slot and a secondary slot are disposed on a virtual gun, and an attachment in the secondary slot is switched to the primary slot according to an attachment switching operation, so that the switching between gun attachments is completed through relatively few operations. In this way, the player does not need to open a virtual backpack, and assemble a gun attachment in the virtual backpack to a slot to replace an original gun attachment in the slot, thereby simplifying the steps of attachment switching and improving the efficiency of human-computer interaction.

According to the method provided in this embodiment, a primary slot and a secondary slot may be further set for the sight switching. That is, when the virtual gun aims down the sight by using the first sight in the primary slot, and the second sight in the secondary slot is switched to the primary slot according to the attachment switching operation, to directly switch from a state of aiming down sight of the first sight to a state of aiming down sight of the second sight, the steps of switching the state of aiming down sight are simplified. In this way, especially in a fierce confrontation process, unnecessary operations of a user can be reduced, thereby improving the efficiency of human-computer interaction, so that the user has more time and energy to pay attention to other core functions without consuming too much energy on changing views.

Figure 6:
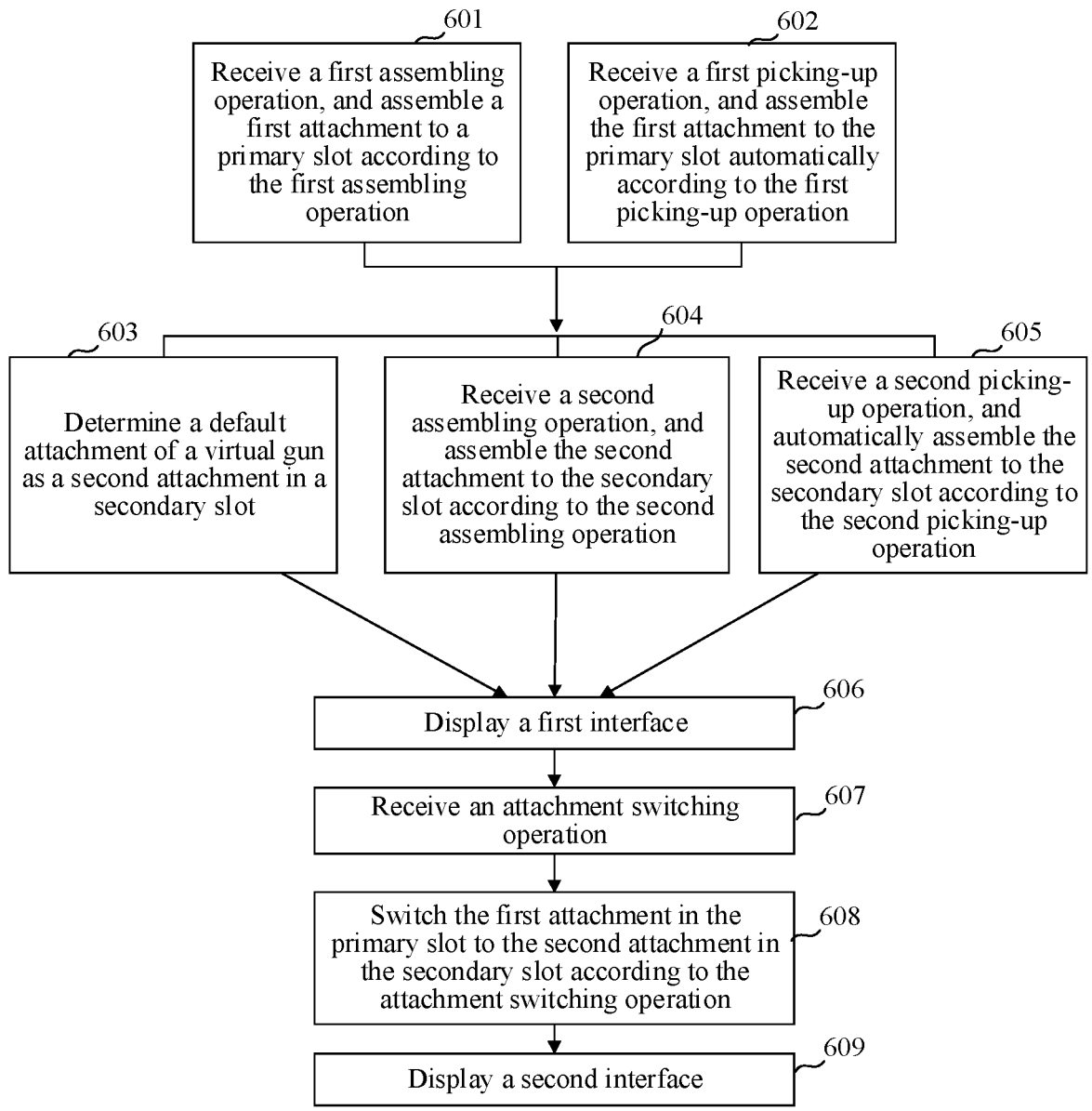
FIG. 6 is a flowchart of an attachment switching method in a virtual environment according to another embodiment.

In some embodiments, before the attachment switching, the player needs to assemble the gun attachment. FIG. 6 is a flowchart of an attachment switching method in a virtual environment according to another embodiment. In this embodiment, description is made by using an example in which the method is applied to a terminal, and the attachment switching method in a virtual environment includes the following steps.

In Step 601, the method includes receiving, by a terminal, a first assembling operation, and the assembling a first attachment to a primary slot according to the first assembling operation.

In some embodiments, the first assembling operation is used for assembling the first attachment to the primary slot. In some embodiments, when the primary slot is not equipped with a gun attachment, a default attachment of the virtual gun may be determined as the first attachment in the primary slot.

In some embodiments, the first attachment is a gun attachment in a storage slot (a backpack of the player) of the virtual object, the user may drag the first attachment to an installation position (for example, a sight position) corresponding to the virtual gun in a backpack list to finish assembling the first attachment to the primary slot; and in some embodiments, the player may drag the first attachment to a region corresponding to the primary slot of the virtual gun to finish assembling the first attachment to the primary slot.

In Step 602, the method may include receiving a first picking-up operation, and assembling the first attachment to the primary slot automatically according to the first picking-up operation.

In some embodiments, the first picking-up operation is used for picking up the first attachment from the ground of the virtual environment to the backpack; in some embodiments, the first picking-up operation is used for directly picking up the first attachment from the ground of the virtual environment and assembling the first attachment to the primary slot. Here, the first picking-up operation may be triggered by a shortcut key or an automatic picking-up operation may be performed by setting an automatic picking-up rule.

When the first attachment is directly assembled to the primary slot automatically according to the first picking-up operation, the first attachment does not occupy the space of the backpack, namely, the capacity of the backpack does not become smaller because of picking up the first attachment.

Step 601 and step 602 are parallel steps. That is, only one of the step 601 and the step 602 can be performed at a time.

In Step 603, the method may include determining a default attachment of a virtual gun as a second attachment in a secondary slot.

The default attachment is a gun attachment carried in the virtual gun. For example, when the gun attachment is a sight, the default attachment of the virtual gun is an iron sight.

When default attachments are in both the primary slot and the secondary slot, namely, neither of the primary slot and the secondary slot is equipped with a gun attachment, the attachment switching cannot be performed.

In Step 604, the method may include receiving a second assembling operation, and assembling the second attachment to the secondary slot according to the second assembling operation.

An execution process of the second assembling operation is the same as that of the foregoing first assembling operation.

In Step 605, the method may include receiving a second picking-up operation, and assembling the second attachment to the secondary slot automatically according to the second picking-up operation.

An execution process of the second picking-up operation is the same as that of the foregoing first picking-up operation.

When the second attachment is directly automatically assembled to the secondary slot according to the second picking-up operation, the second attachment does not occupy the space of the backpack, namely, the capacity of the backpack does not become smaller because of picking up the second attachment.

Step 603 to step 605 are parallel steps. That is, only one of the step 603, the step 604, or the step 605 can be performed at a time.

However, steps 601 through 605 are not limited to this execution sequence.

In Step 606, the method includes displaying a first interface.

In some embodiments, the first interface includes an image of the virtual environment observed by a virtual object, the virtual object holds a virtual gun, and a primary slot of the virtual gun is equipped with a first attachment.

In some embodiments, the virtual gun held by the virtual object may be directly obtained by using the virtual object to observe in the first interface. For example, one hand of the virtual object holds the virtual gun, and the first attachment is displayed on the virtual gun. Alternatively, the virtual gun may be obtained by observing a gun status bar displayed in the first interface. For example, the virtual gun is displayed in the gun status bar, and the first attachment is displayed corresponding to the virtual gun;

In some embodiments, the virtual gun held by the virtual object may not be obtained by the virtual object in the virtual environment according to the first interface. For example, the virtual object and the virtual gun may not be displayed in the first interface, but the virtual gun may be obtained by observing the gun status bar displayed in the first interface.

In some embodiments, the virtual gun held by the virtual object can be directly obtained by using the virtual object to observe in the first interface, but the gun status bar is not displayed in the first interface, so that the virtual gun cannot be obtained by observing the gun status bar. An observation manner of the virtual gun is not limited in the embodiments of this application.

In some embodiments, the first interface may be an interface displayed by using a first-person viewing angle of the virtual object, or may be an interface displayed by using a third-person viewing angle of the virtual object.

In Step 607, the method may include receiving an attachment switching operation.

In some embodiments, a manner in which the terminal receives the attachment switching operation includes at least one of the following manners.

First, the terminal receives a shortcut key operating signal and determines that the attachment switching operation is received in a case that a shortcut key combination corresponding to the shortcut key operating signal is a target shortcut key combination.

When the terminal is at least one of a desktop computer and a laptop computer, the shortcut key operating signal may be triggered by an input operation of an external device. For example, a shortcut key signal is triggered by inputting Ctrl+V by using a keyboard, and when the terminal is a mobile terminal such as a mobile phone, the shortcut key operating signal may be triggered by pressing on a physical key on the mobile terminal, or may be triggered by an input operation of a virtual keyboard on a touch screen.

Second, the terminal determines that the attachment switching operation is received in a case that the first interface includes an attachment switching control and receives a touch signal on the attachment switching control.

When the terminal is a terminal with a touch display screen, the attachment switching operation may be alternatively determined by touching the attachment switching control on the touch display screen.

In some embodiments, in a case that the terminal receives the attachment switching operation, the terminal displays switching prompt information in the first interface, where the switching prompt information is used for indicating information of an attachment switched to the primary slot after attachment switching. In some embodiments, in a case that the terminal displays the switching prompt information, switching between gun attachments has not been completed, and the player can trigger the attachment switching operation for a number of times to switch between gun attachments. For example, when the attachment switching operation is triggered through the shortcut key Ctrl+V, the player continuously presses the Ctrl key on the keyboard, and presses the V key simultaneously. After the player presses the V key for the first time, the switching prompt information prompts that the gun attachment after the switching is a 4× sight. After the player presses the V key again without releasing the Ctrl key, the switching prompt information prompts that the gun attachment after the switching is a red dot sight, and the gun attachment in the primary slot is switched to the red dot sight after releasing the Ctrl key.

In Step 608, the method may include switching the first attachment in the primary slot to the second attachment in the secondary slot according to the attachment switching operation.

In some embodiments, the primary slot and the secondary slot are both the same type of gun attachment slots of the virtual gun, and the first attachment and the second attachment are the same type of gun attachments corresponding to the virtual gun.

In some embodiments, the terminal switches the second attachment in the secondary slot to the first attachment in the primary slot according to the attachment switching operation.

In some embodiments, when the virtual gun is provided with two or more secondary slots, gun attachments in the secondary slots may be switched with the gun attachment in the primary slot sequentially according to the attachment switching operation, and a switching manner includes at least one of the following manners.

First, a switching operation of the gun attachments between the primary slot and the secondary slots may be performed sequentially as shown in Table 1 as follows:

TABLE 1

| Number of switching times | Primary slot | Secondary slot A | Secondary slot B |
| --- | --- | --- | --- |
| 1 | Gun attachment a | Gun attachment b | Gun attachment c |
| 2 | Gun attachment b | Gun attachment c | Gun attachment a |
| 3 | Gun attachment c | Gun attachment a | Gun attachment b |

According to Table 1, the gun attachment a, the gun attachment b, and the gun attachment c are sequentially switched among the primary slot, the secondary slot A, and the secondary slot B.

Second, a switching operation of the gun attachments in the secondary slots with the gun attachment in the primary slot may be performed according to Table 2 as follows:

TABLE 2

| Number of switching times | Primary slot | Secondary slot A | Secondary slot B |
| --- | --- | --- | --- |
| 0 | Gun attachment a | Gun attachment b | Gun attachment c |
| 1 | Gun attachment b | Gun attachment a | Gun attachment c |
| 2 | Gun attachment c | Gun attachment b | Gun attachment a |

In Step 609, the method may include displaying a second interface on the terminal.

The second interface may include an image of the virtual environment observed by a virtual object, where the virtual object holds a virtual gun, and a primary slot of the virtual gun is equipped with a second attachment.

In some embodiments, the virtual gun held by the virtual object may be directly obtained by using the virtual object to observe in the second interface. For example, one hand of the virtual object holds the virtual gun, and the second attachment is displayed on the virtual gun. Alternatively, the virtual gun may be obtained by observing a gun status bar displayed in the second interface. For example, the virtual gun is displayed in the gun status bar, and the second attachment is displayed corresponding to the virtual gun.

In some embodiments, the virtual gun held by the virtual object cannot be obtained by using the virtual object to observe in the second interface. For example, the virtual object and the virtual gun are not displayed in the second interface, but the virtual gun can be obtained by observing the gun status bar displayed in the second interface.

In some embodiments, the virtual gun held by the virtual object can be directly obtained by using the virtual object to observe in the second interface, but the gun status bar is not displayed in the second interface, so that the virtual gun cannot be obtained by observing the gun status bar. However, an observation manner of the virtual gun is not limited hereto.

In some embodiments, the second interface may be an interface displayed by using the first-person viewing angle of the virtual object, or may be an interface displayed by using the third-person viewing angle of the virtual object.

In some embodiments, when the second interface is displayed by using the third-person viewing angle of the virtual object, the second interface may include the virtual gun, and an assembled second attachment is displayed on the virtual gun.

In some embodiments, switching success information may be displayed in the second interface in a case that the first attachment in the primary slot is switched to the second attachment in the secondary slot, and the switching success information is used for indicating attachment information of the second attachment that is switched to the primary slot. For example, the switching success information includes an attachment name of the second attachment that is switched to the primary slot.

Figure 7:
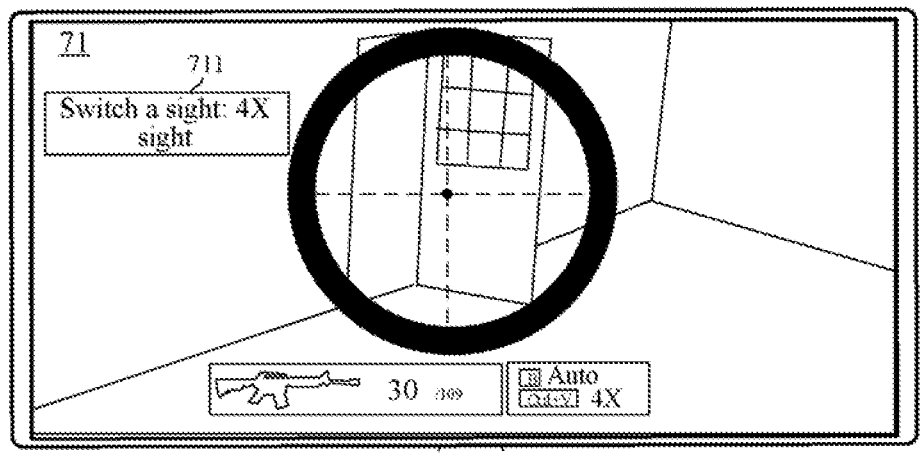
FIG. 7 is a schematic diagram of an interface of a terminal according to another embodiment.

Referring to FIG. 7, when the first attachment in the primary slot is switched to a 4× sight in the secondary slot, switching success information 711 is displayed in a second interface 71, and the switching success information 711 includes an attachment name "4× sight" of the gun attachment that is switched to the primary slot.

Based on the above, according to the attachment switching method in a virtual environment provided in this embodiment, a primary slot and a secondary slot are disposed on a virtual gun, and an attachment in the secondary slot is switched to the primary slot according to an attachment switching operation, so that the switching between gun attachments is completed through relatively few operations. In this way, the player does not need to open a virtual backpack, and assemble a gun attachment in the virtual backpack to a slot to replace an original gun attachment in the slot, thereby simplifying the steps of attachment switching and improving the efficiency of human-computer interaction.

According to the attachment switching method in a virtual environment provided in this embodiment, switching prompt information is displayed on the first interface, to prompt the user of the information of the gun attachment that is about to be switched to the primary slot, to implement more precise switching.

According to the attachment switching method in a virtual environment provided in this embodiment, the switching success information is displayed on the second interface to prompt the user of the information of the gun attachment that is switched to the primary slot, and to prompt the user to better use the gun attachment in the primary slot.

According to the attachment switching method in a virtual environment provided in this embodiment, the gun attachments are directly assembled to the primary slot and the secondary slot according to at least one of the first picking-up operation and the second picking-up operation without putting the gun attachments in the backpack, thereby relieving the capacity pressure of the backpack.

Figure 8:
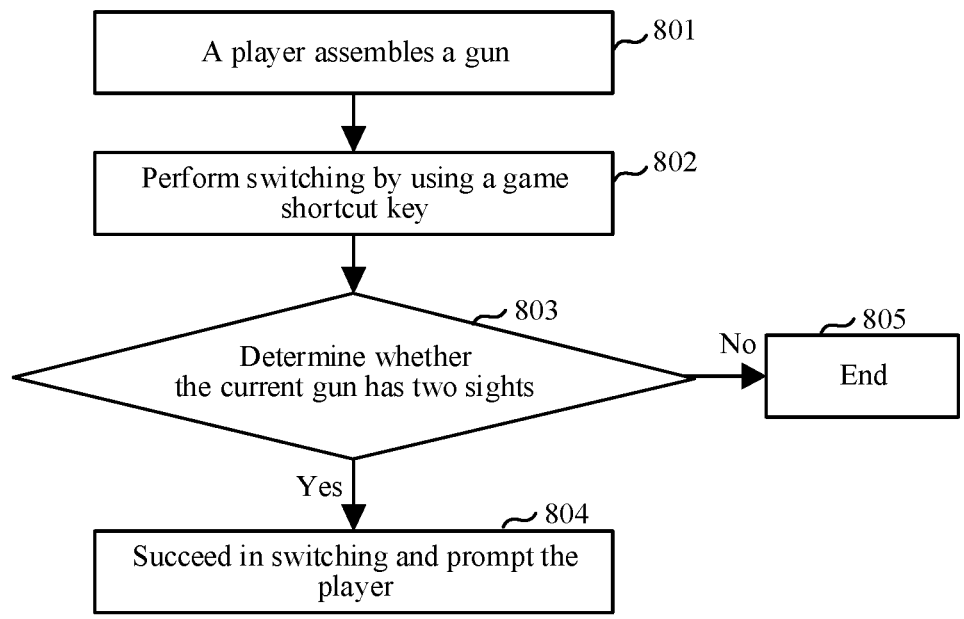
FIG. 8 is a flowchart of an attachment switching method in a virtual environment according to another embodiment.

FIG. 8 is a flowchart of an attachment switching method in a virtual environment according to an embodiment. In this embodiment, description is made by using an example in which the method is applied to a terminal and a TPS game client is installed in the terminal, and the attachment switching method in a virtual environment includes the following steps.

In Step 801, the method may include assembling a gun by a player (or a user of a virtual object).

In some embodiments, the player picks up a virtual gun and a gun attachment matching the virtual gun to assemble the virtual gun, namely, assemble the gun attachment matching the virtual gun to the virtual gun.

In Step 802, the method may include performing switching by using a game shortcut key.

In some embodiments, the game shortcut key may be inputted by an external input device such as a keyboard or a mouse. For example, if the game shortcut key is Ctrl+V, the player switches the gun attachment by inputting Ctrl+V. However, the shortcut key may be arranged differently according to the player's preference.

In Step 803, the method may include determining whether the current gun has at least two sights.

In some embodiments, it is determined whether a primary slot and a secondary slot of the virtual gun are both equipped with sights. The sights in the primary slot and the secondary slot may be the same, or may be different.

In some embodiments, when the sights in the primary slot and the secondary slot are both iron sights, a determination result is that there are no two sights on the gun.

In Step 804, the method may include prompting a success of switching message to the player based on switching the sights provided in the current gun.

In Step 805, when there aren't at least two sights provided by the current gun, the method is terminated.

Based on the above, according to the attachment switching method in a virtual environment provided in this embodiment, a primary slot and a secondary slot are disposed on a virtual gun, and an attachment in the secondary slot is switched to the primary slot according to an attachment switching operation, so that the switching between gun attachments is completed through relatively few operations. In this way, the player does not need to open a virtual backpack, and assemble a gun attachment in the virtual backpack to a slot to replace an original gun attachment in the slot, thereby simplifying the steps of attachment switching and improving the efficiency of human-computer interaction.

It is to be understood that the steps according to the embodiments herein may not be necessarily performed according to a sequence indicated in the embodiments. The sequence for performing the steps is not strictly limited, and the steps may be performed in other sequences. Moreover, at least some of the steps in each embodiment may include a plurality of sub-steps or a plurality of stages. The sub-steps or stages are not necessarily performed at the same moment, but may be performed at different moments. The sub-steps or stages are not necessarily performed in sequence, but may be performed in turn or alternately with at least some of other steps or sub-steps or stages of the other steps.

In an embodiment, the terminal includes an attachment switching apparatus in a virtual environment, the attachment switching apparatus in a virtual environment includes modules, and each module (or code) may be all or partially implemented by using software, hardware, or a combination thereof.

Figure 9:
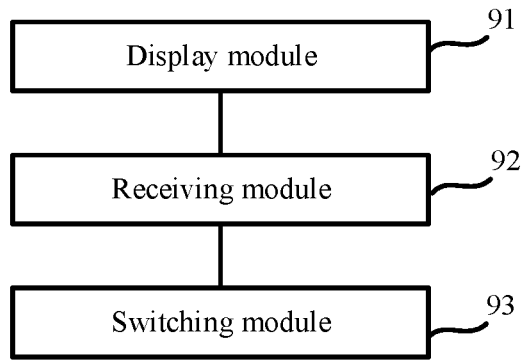
FIG. 9 is a structural block diagram of an attachment switching apparatus in a virtual environment according to an embodiment.

FIG. 9 is a structural block diagram of an attachment switching apparatus in a virtual environment according to an embodiment. As shown in FIG. 9, the attachment switching apparatus in a virtual environment includes a display module 91, a receiving module 92, and a switching module 93. Here, the display module 91 is configured to display a first interface that includes an image of the virtual environment observed by a virtual object, the virtual object holding a virtual gun, and a primary slot of the virtual gun being equipped with a first attachment. The receiving module 92 is configured to receive an attachment switching operation and the switching module 93 is configured to switch the first attachment in the primary slot to a second attachment in a secondary slot according to the attachment switching operation. The primary slot and the secondary slot may be the same type of gun attachment slots of the virtual gun, and the first attachment and the second attachment may be the same type of gun attachments adapting to the virtual gun.

In some embodiments, the first attachment corresponds to a first attachment identifier, and the second attachment corresponds to a second attachment identifier. The switching module 93 may further include a reading unit configured to obtain the second attachment identifier corresponding to the secondary slot according to the attachment switching operation, and a modification unit configured to modify an attachment identifier corresponding to the primary slot from the first attachment identifier to the second attachment identifier.

In some embodiments, the receiving module 92 is configured to receive a shortcut key operating signal and determine that the attachment switching operation is received in a case that a shortcut key combination corresponding to the shortcut key operating signal is a target shortcut key combination.

In some embodiments, the first interface includes an attachment switching control. The receiving module 92 is configured to determine that the attachment switching operation is received in a case that the terminal receives a touch signal on the attachment switching control.

In an embodiment, the display module 91 is configured to display a second interface, the second interface including a picture of the virtual environment observed by the virtual object, the virtual object holding the virtual gun, and the primary slot of the virtual gun being equipped with the second attachment.

In some embodiments, the primary slot and the secondary slot are slots used for assembling a sight, the first attachment is a first sight, and the second attachment is a second sight.

The receiving module 92 is configured to receive an aiming down sight operation, the aiming down sight operation being used for observing the virtual environment through the first sight in the primary slot and the display module 91 is configured to display the first interface according to the first sight, the first interface including the virtual environment that is magnified according to a magnification of the first sight and displayed.

The display module 91 is configured to display the second interface according to the second sight, the second interface including the virtual environment that is magnified according to a magnification of the second sight and displayed.

In some embodiments, the display module 91 is configured to display the first interface according to a third-person viewing angle of the virtual object, the first interface including the virtual gun, and the assembled first attachment being displayed on the virtual gun; and the display module 91 is configured to display the second interface according to the third-person viewing angle of the virtual object, the second interface including the virtual gun on which attachment switching is performed, and the assembled second attachment being displayed on the virtual gun on which attachment switching is performed.

In some embodiments, the display module 91 is configured to display switching prompt information in the first interface in a case that the terminal receives the attachment switching operation, the switching prompt information being used for indicating that an attachment is switched to the primary slot and the display module 91 is configured to display switching success information in the second interface in a case that the first attachment in the primary slot is switched to the second attachment in the secondary slot, the switching success information being used for indicating that the second attachment that is switched to the primary slot, and the switching success information including an attachment name of the second attachment that is switched to the primary slot.

In some embodiments, the receiving module 92 is configured to receive a first assembling operation, and assemble the first attachment to the primary slot according to the first assembling operation, and the receiving module 92 is configured to receive a first picking-up operation, the first picking-up operation being used for picking up the first attachment; and assemble the first attachment to the primary slot automatically according to the first picking-up operation.

In some embodiments, the receiving module 92 is further configured to determine a default attachment of the virtual gun as the second attachment in the secondary slot, receive a second assembling operation, and assemble the second attachment to the secondary slot according to the second assembling operation. Furthermore, the receiving module 92 is configured to receive a second picking-up operation, the second picking-up operation being used for picking up the second attachment; and assemble the second attachment to the secondary slot automatically according to the second picking-up operation.

In some embodiments, the switching module 93 is configured to switch the first attachment in the primary slot to the second attachment in the secondary slot according to the attachment switching operation.

Based on the above, according to the attachment switching apparatus in a virtual environment provided in this embodiment, a primary slot and a secondary slot are disposed on a virtual gun, and an attachment in the secondary slot is switched to the primary slot according to an attachment switching operation, so that the switching between gun attachments is completed through relatively few operations. In this way, the player does not need to open a virtual backpack, and assemble a gun attachment in the virtual backpack to a slot to replace an original gun attachment in the slot, thereby simplifying the steps of attachment switching.

Figure 10:
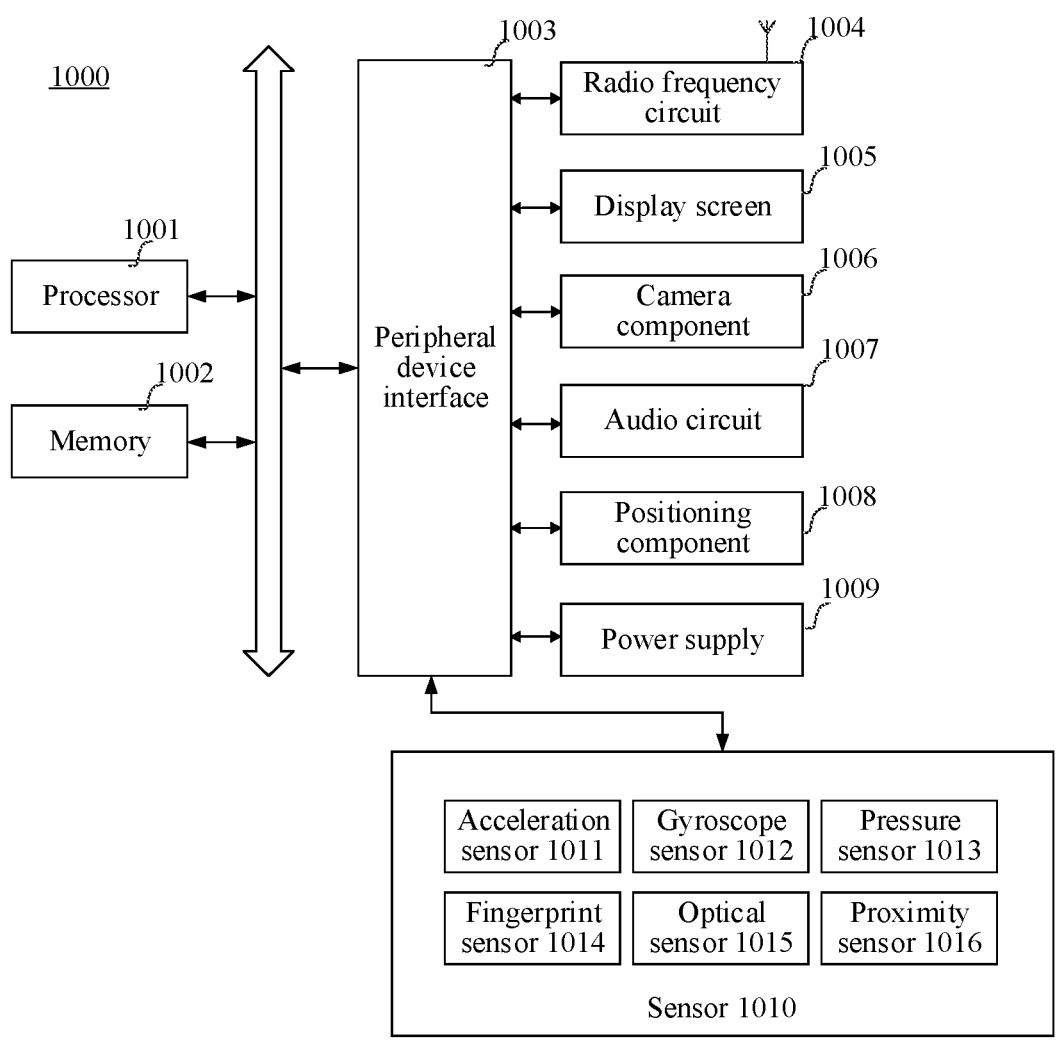
FIG. 10 is a structural block diagram of a terminal according to an embodiment.

FIG. 10 shows a structural block diagram of a terminal device 1000 according to an embodiment. The terminal 1000 may be a smartphone, a tablet computer, a moving picture experts group audio layer III (MP3) player, a moving picture experts group audio layer IV (MP4) player, a notebook computer, or a desktop computer. The terminal 1000 may also be referred to as another name such as user equipment, a portable terminal, a laptop terminal, or a desktop terminal.

The terminal 1000 includes a processor 1001 and a memory 1002.

The processor 1001 may include one or more processing cores, for example, a 4-core processor or an 8-core processor. The processor 1001 may be implemented by at least one hardware form of a digital signal processor (DSP), a field-programmable gate array (FPGA), and a programmable logic array (PLA). The processor 1001 may alternatively include a main processor and a coprocessor. The main processor is a processor configured to process data in an awake state, also referred to as a central processing unit (CPU) and the coprocessor is a low-power processor configured to process the data in an idle state. In some embodiments, the processor 1001 may be integrated with a graphics processing unit (GPU). The GPU is configured to render drawing content to be displayed by a display screen. In some embodiments, the processor 1001 may include an artificial intelligence (AI) processor. The AI processor is configured to process a calculation operation related to machine learning.

The memory 1002 may include one or more computer-readable storage media. The computer-readable storage media may be non-transient. The memory 1002 may include a high-speed random access memory and a non-volatile memory such as one or more magnetic disk storage devices and a flash memory device. In some embodiments, the non-transient computer-readable storage medium in the memory 1002 is configured to store at least one instruction, and the at least one instruction is configured to be executed by the processor 1001 to implement the attachment switching method in a virtual environment provided according to an embodiment.

In some embodiments, the terminal 1000 may include a peripheral device interface 1003 and at least one peripheral device. The processor 1001, the memory 1002 and the peripheral device interface 1003 may be connected through a bus or a signal cable. Each peripheral device may be connected to the peripheral device interface 1003 through a bus, a signal cable, or a circuit board. Specifically, the peripheral device includes at least one of a radio frequency (RF) circuit 1004, a touch display screen 1005, a camera 1006, an audio circuit 1007, a positioning component 1008, or a power supply 1009.

The peripheral device interface 1003 may be configured to connect at least one peripheral device related to input/output (I/O) to the processor 1001 and the memory 1002. In some embodiments, the processor 1001, the memory 1002 and the peripheral device interface 1003 are integrated into a same chip or circuit board. In some embodiments, any one or two of the processor 1001, the memory 1002, and the peripheral device interface 1003 may be implemented on an independent chip or the circuit board. However, this is not limited thereto.

The RF circuit 1004 is configured to receive and transmit a radio frequency signal, also referred to as an electromagnetic signal. The RF circuit 1004 communicates with a communications network and another communications device by using the electromagnetic signal. The RF circuit 1004 converts an electrical signal into an electromagnetic signal for transmission, or converts a received electromagnetic signal into an electrical signal. In some embodiments, the RF circuit 1004 includes an antenna system, an RF transceiver, one or more amplifiers, a tuner, an oscillator, a digital signal processor, a codec chip set, a subscriber identity module card, and the like. The RF circuit 1004 may communicate with another terminal by using at least one wireless communication protocol. The wireless communication protocol includes, but is not limited to, at least one of a world wide web, a metropolitan area network, an intranet, generations of mobile communication networks (2G, 3G, 4G, and 5G), a wireless local area network and a wireless fidelity (Wi-Fi) network. In some embodiments, the RF circuit 1004 may include a near field communication (NFC) related circuit. However, the RF circuit is not limited thereto.

The display screen 1005 is configured to display a user interface (UI). The UI may include a graph, text, an icon, a video, and any combination thereof. When the display screen 1005 is the touch display screen, the display screen 1005 is capable of collecting a touch signal on or above a surface of the display screen 1005. The touch signal may be inputted into the processor 1001 as a control signal for processing. In this case, the display screen 1005 may be configured to provide at least one of a virtual button and a virtual keyboard, also referred to as at least one of a soft button and a soft keyboard. In some embodiments, there may be one display screen 1005, disposed on a front panel of the terminal 1000. In some other embodiments, there may be at least two display screens, disposed on different surfaces of the terminal 1000 respectively or designed in a foldable shape. In still some other embodiments, the display screen 1005 may be a flexible display screen, disposed on a curved surface or a folded surface of the terminal 1000. Even, the display screen 1005 may be set to display a non-rectangular irregular graph, namely, a special-shaped screen. The display screen 1005 may be manufactured by using a material such as a liquid crystal display (LCD), an organic light-emitting diode (OLED), or the like.

The camera component 1006 is configured to collect an image or a video. In some embodiments, the camera component 1006 includes a front-facing camera and a rear-facing camera. The front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 1006 may include a flash. The flash may be a single color temperature flash, or may be a double color temperature flash. The double color temperature flash refers to a combination of a warm flash and a cold flash, and may be configured to perform light ray compensation at different color temperatures.

The audio circuit 1007 may include a microphone and a loudspeaker. The microphone is configured to collect sound waves of a user and an environment, and convert the sound waves into electrical signals and input the electrical signals into the processor 1001 for processing, or input the electrical signals into the RF circuit 1004 to implement speech communication. For the purpose of stereo collection or noise reduction, there may be a plurality of microphones, disposed at different parts of the terminal 1000 respectively. The microphone may be a microphone array or an omnidirectional collection microphone. The loudspeaker is configured to convert electrical signals from the processor 1001 or the RF circuit 1004 into sound waves. The loudspeaker may be a conventional thin-film loudspeaker, or may be a piezoelectric ceramic loudspeaker. When the speaker is the piezoelectric ceramic loudspeaker, electrical signals not only can be converted into sound waves that can be heard by human, but also can be converted into sound waves at a range that cannot be heard by human. In some embodiments, the audio circuit 1007 may further include an earphone jack.

The positioning component 1008 is configured to determine a current geographic location of the terminal 1000 through positioning to implement navigation or a location based service (LBS). The positioning component 1008 may be a positioning component based on the Global Positioning System (GPS) of the United States, China's Beidou Navigation Satellite System (BDS), GLONASS of Russia, or the Galileo system of the European Union.

The power supply 1009 is configured to supply power to components in the terminal 1000. The power supply 1009 may be an alternating current, a direct current, a primary battery, or a rechargeable battery. When the power supply 1009 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1000 includes one or more sensors 1010. The one or more sensors 1010 include, but are not limited to, an acceleration sensor 1011, a gyroscope sensor 1012, a pressure sensor 1013, a fingerprint sensor 1014, an optical sensor 1015, and a proximity sensor 1016.

The acceleration sensor 1011 may detect accelerations on three coordinate axes of a coordinate system established by the terminal 1000. For example, the acceleration sensor 1011 may be configured to detect components of gravity acceleration on the three coordinate axes. The processor 1001 may control, according to a gravity acceleration signal collected by the acceleration sensor 1011, the touch display screen 1005 to display the user interface in a frame view or a portrait view. The acceleration sensor 1011 may be configured to collect motion data of a game or a user.

The gyroscope sensor 1012 may detect a body direction and a rotation angle of the terminal 1000. The gyroscope sensor 1012 may cooperate with the acceleration sensor 1011 to collect a 3D action by the user on the terminal 1000. The processor 1001 may implement the following functions according to the data collected by the gyroscope sensor 1012: motion sensing (such as changing the UI according to a tilt operation of the user), image stabilization during shooting, game control, and inertial navigation.

The pressure sensor 1013 may be disposed on a side frame of the terminal 1000 and/or a lower layer of the touch display screen 1005. When the pressure sensor 1013 is disposed on the side frame of the terminal 1000, a holding signal of the user on the terminal 1000 may be detected. The processor 1001 performs left and right hand recognition or a quick operation according to the holding signal collected by the pressure sensor 1013. When the pressure sensor 1013 is disposed on the lower layer of the touch display screen 1005, the processor 1001 controls an operable control on the UI according to a pressure operation of the user on the touch display screen 1005. The operable control includes at least one of a button control, a scroll bar control, an icon control and a menu control.

The fingerprint sensor 1014 is configured to collect a fingerprint of the user. The processor 1001 identifies an identity of the user according to the fingerprint collected by the fingerprint sensor 1014, or the fingerprint sensor 1014 identifies an identity of the user according to the collected fingerprint. When the identity of the user is identified as a trusted identity, the processor 1001 authorizes the user to perform a related sensitive operation. The sensitive operation includes unlocking a screen, viewing encryption information, downloading software, payment, changing setting, and the like. The fingerprint sensor 1014 may be disposed on a front face, a back face, or a side face of the terminal 1000. When a physical button is disposed on the terminal 1000, the fingerprint sensor 1014 may be integrated together with the physical button.

The optical sensor 1015 is configured to collect ambient light intensity. In an embodiment, the processor 1001 may control display luminance of the touch display screen 1005 according to the ambient light intensity collected by the optical sensor 1015. Specifically, when the ambient light intensity is relatively high, the display luminance of the touch display screen 1005 is increased. When the ambient light intensity is relatively low, the display luminance of the touch display screen 1005 is reduced. In another embodiment, the processor 1001 may further dynamically adjust shooting parameters of the camera component 1006 according to the ambient light intensity collected by the optical sensor 1015.

The proximity sensor 1016, also referred to as a distance sensor, may be disposed on the front panel of the terminal 1000. The proximity sensor 1016 is configured to collect a distance between a front face of the user and the front face of the terminal 1000. In an embodiment, when the proximity sensor 1016 detects that the distance between the front face of the user and the front face of the terminal 1000 is gradually decreased, the processor 1001 controls the touch display screen 1005 to switch from a screen-on state to a screen-off state. When the proximity sensor 1016 detects that the distance between the front face of the user and the front face of the terminal 1000 is gradually increased, the processor 1001 controls the touch display screen 1005 to switch from the screen-off state to the screen-on state.

A person skilled in the art may understand that the structure shown in FIG. 10 does not constitute a limitation on the terminal 1000, and the terminal may include more or fewer components than those shown in the figure, or some components may be combined, or a different component deployment may be used.

Figure 11:
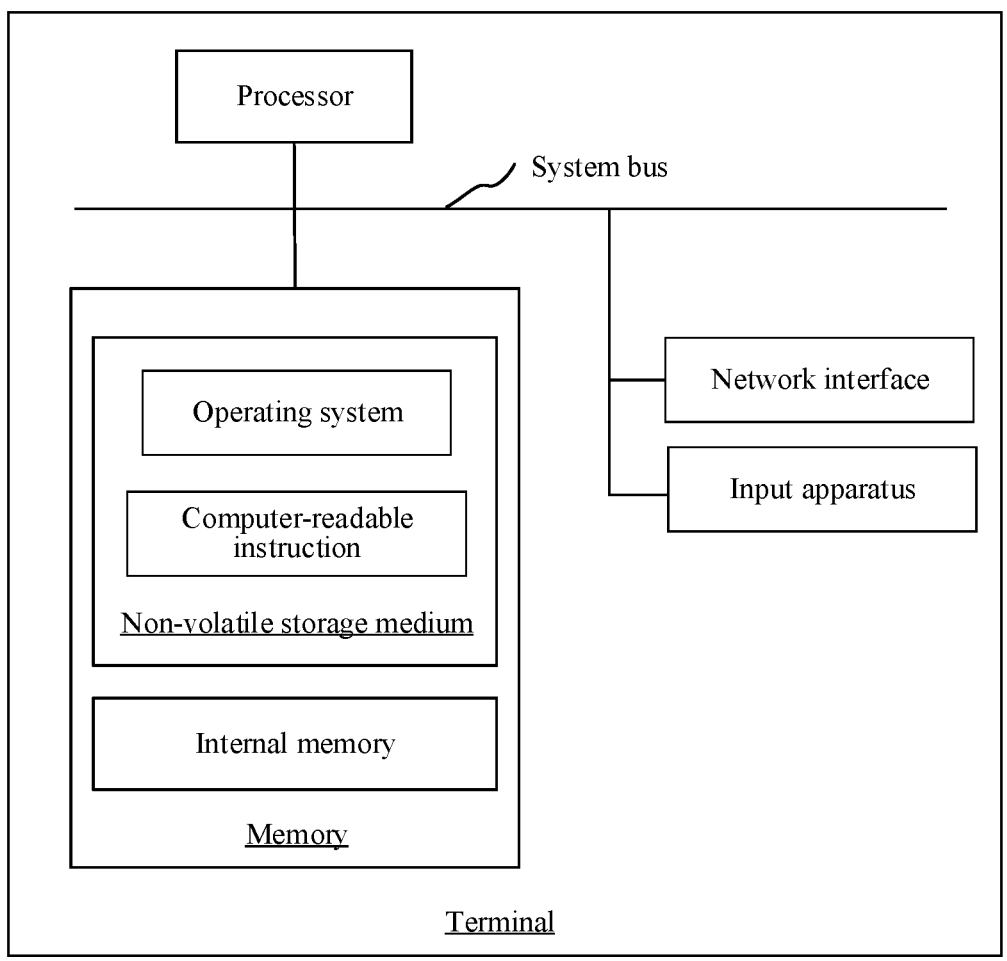
FIG. 11 shows a diagram of an internal structure of a terminal according to an embodiment.

FIG. 11 shows a diagram of an internal structure of a terminal according to an embodiment. As shown in FIG. 11, the terminal includes a processor, a memory, a network interface, and an input apparatus that are connected through a system bus. The memory includes a non-volatile storage medium and an internal memory. The non-volatile storage medium of the terminal stores an operating system, and may store a computer-readable instruction, and the computer-readable instruction, when executed by the processor, may cause the processor to implement an attachment switching method in a virtual environment. The internal memory may also store a computer-readable instruction, and the computer-readable instruction, when executed by the processor, may cause the processor to perform the attachment switching method in a virtual environment. The input apparatus may be a touch layer covering a display screen, or may be a button, a trackball, or a touchpad disposed on a housing of the terminal, or may be an external keyboard, touchpad, or mouse.

A person skilled in the art may understand that, in the structure shown in FIG. 11, only a block diagram of a partial structure related to embodiments of the disclosure, and does not constitute a limitation on the terminal to which the embodiments are implemented. Specifically, the terminal may include more components or fewer components than those shown in the figure, or some components may be combined, or a different component deployment may be used.

In an embodiment, the attachment switching apparatus in a virtual environment provided in this disclosure may be implemented in the form of a computer-readable instruction, and the computer-readable instruction may be executed by the terminal shown in FIG. 11. The memory of the terminal may store program modules or codes forming the attachment switching apparatus in a virtual environment, such as the display module 91, the receiving module 92, and the switching module 93 shown in FIG. 9. A computer-readable instruction formed by the program modules causes the processor to perform the steps in the attachment switching method in a virtual environment in the embodiments of this application described in this specification.

According to an embodiment, a computer-readable storage medium, storing a computer-readable instruction, when the computer-readable instruction is loaded and executed by a processor, performs the attachment switching method in a virtual environment shown in FIG. 1.

A person of ordinary skill in the art may understand that all or some of the processes of the methods in the embodiments may be implemented by a computer program instructing related hardware. The program may be stored in a non-volatile computer-readable storage medium, and the program, when executed, may include the processes of the methods in the embodiments. Any reference to a memory, a storage, a database, or another medium used in the embodiments provided in this application may include at least one of a non-volatile memory and a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external high-speed cache memory. As an illustration instead of a limitation, the RAM is available in various forms, such as a static RAM (SRAM), a dynamic RAM (DRAM), a synchronous DRAM (SDRAM), a double data rate SDRAM (DDR SDRAM), an enhanced SDRAM (ESDRAM), a synchronization link (Synchlink) DRAM (SLDRAM), a memory Bus (Rambus) direct RAM (RDRAM), a direct rambus dynamic RAM (DRDRAM), and a rambus dynamic RAM (RDRAM).

The technical features in the foregoing embodiments may be randomly combined. For concise description, not all possible combinations of the technical features in the embodiments are described. However, as long as combinations of the technical features do not conflict with each other, the combinations of the technical features are considered as falling within the scope described in this disclosure.

What is claimed is:

1. An attachment switching method in a virtual environment, performed by a terminal, the method comprising:
    displaying, by the terminal, a first interface, the first interface comprising an image of the virtual environment observed by a virtual object, the virtual object holding a virtual gun, and a primary slot of the virtual gun being equipped with a first attachment;
    receiving, by the terminal, an attachment switching operation; and
    switching, by the terminal, the first attachment in the primary slot to a second attachment in a secondary slot according to the attachment switching operation, the primary slot and the secondary slot being the same type of gun attachment slots of the virtual gun,
    wherein the first attachment is identified by a first attachment identifier and the second attachment is identified by a second attachment identifier,
    wherein each of the first attachment identifier and the second attachment identifier is represented by a first flag bit and a second flag bit indicating whether the virtual gun is assembled in the primary slot and the secondary slot, respectively, and
    wherein the switching the first attachment in the primary slot to the second attachment in the secondary slot comprises modifying the first flag bit of the first attachment identifier to the second flag bit of the second attachment identifier.

2. The method according to claim 1, wherein the receiving the attachment switching operation comprises:
    receiving a shortcut key operating signal from a user; and
    determining that the attachment switching operation is received based on a shortcut key combination corresponding to the shortcut key operating signal being a target shortcut key combination.

3. The method according to claim 1, wherein the first interface further comprises an attachment switching control interface, and
    wherein the receiving an attachment switching operation comprises determining that the attachment switching operation is received based on receiving a touch signal on the attachment switching control interface.

4. The method according to claim 1, wherein after the receiving the attachment switching operation, the method further comprises:
    displaying a second interface, the second interface comprising an image of the virtual environment observed by the virtual object, the virtual object holding the virtual gun, and the primary slot of the virtual gun being equipped with the second attachment.

5. The method according to claim 4, wherein the primary slot and the secondary slot are slots used for assembling a sight,
    wherein the first attachment is a first sight, and the second attachment is a second sight,
    wherein the displaying the first interface further comprises:
    receiving an aiming down sight operation, the aiming down sight operation being used for observing the virtual environment through the first sight in the primary slot and displaying the first interface according to the first sight, the first interface comprising the virtual environment that is magnified according to a magnification of the first sight, and
    wherein the displaying the second interface further comprises displaying the second interface according to the second sight, the second interface comprising the virtual environment that is magnified according to a magnification of the second sight.

6. The method according to claim 4, wherein the displaying the first interface further comprises displaying the first interface according to a third-person viewing angle of the virtual object, and displaying the virtual gun, and the assembled first attachment on the virtual gun, and
    wherein the displaying the second interface further comprises displaying the second interface according to the third-person viewing angle of the virtual object, and displaying the virtual gun on which attachment switching is performed, and the assembled second attachment being displayed on the virtual gun on which attachment switching is performed.

7. The method according to claim 4, further comprising displaying switching prompt information in the first interface, the switching prompt information indicating information of a status of the attachment switching operation.

8. The method according to claim 4, further comprising displaying switching success information in the second interface based on the first attachment in the primary slot being switched to the second attachment in the secondary slot, the switching success information including attachment information of the second attachment that is switched to the primary slot.

9. The method according to claim 1, wherein, before the displaying the first interface, the method further comprises receiving a first assembling operation, and assembling the first attachment to the primary slot according to the first assembling operation.

10. The method according to claim 1, wherein, before the displaying the first interface, the method further comprises receiving a first picking-up operation, the first picking-up operation being used for picking up the first attachment and assembling the first attachment to the primary slot automatically according to the first picking-up operation.

11. The method according to claim 9, wherein, before the receiving the attachment switching operation, the method further comprises determining a default attachment of the virtual gun as the second attachment in the secondary slot.

12. The method according to claim 9, wherein, before the receiving the attachment switching operation, the method further comprises receiving a second assembling operation and assembling the second attachment to the secondary slot according to the second assembling operation.

13. The method according to claim 10, wherein, before the receiving the attachment switching operation, the method further comprises receiving a second picking-up operation, the second picking-up operation being used for picking up the second attachment and assembling the second attachment to the secondary slot automatically according to the second picking-up operation.

14. An attachment switching apparatus, comprising:
at least one memory storing computer program code; and
at least one processor configured to access the computer program and operate as instructed by the computer program code, the computer program code comprising:
display code configured to cause the at least one processor to display a first interface, the first interface comprising an image of a virtual environment observed by a virtual object, the virtual object holding a virtual gun, and a primary slot of the virtual gun being equipped with a first attachment;
receiving code configured to cause the at least one processor to receive an attachment switching operation; and
switching code configured to cause the at least one processor to switch the first attachment in the primary slot to a second attachment in a secondary slot according to the attachment switching operation, the primary slot and the secondary slot being the same type of gun attachment slots of the virtual gun,
wherein the first attachment is identified by a first attachment identifier and the second attachment is identified by a second attachment identifier,
wherein each of the first attachment identifier and the second attachment identifier is represented by a first flag bit and a second flag bit indicating whether the virtual gun is assembled in the primary slot and the secondary slot, respectively, and
wherein the switching code is further configured to cause the at least one processor to modify the first flag bit of the first attachment identifier to the second flag bit of the second attachment identifier.

15. The attachment switching apparatus according to claim 14, wherein the receiving code is further configured to cause the at least one processor to:
receive a shortcut key operating signal from a user, and
determine that the attachment switching operation is received based on a shortcut key combination corresponding to the shortcut key operating signal being a target shortcut key combination.

16. The attachment switching apparatus according to claim 14, wherein the display code is further configured to cause the at least one processor to, after receiving the attachment switching operation, display a second interface, the second interface comprising an image of the virtual environment observed by the virtual object, the virtual object holding the virtual gun, and the primary slot of the virtual gun being equipped with the second attachment.

17. The attachment switching apparatus according to claim 16, wherein the primary slot and the secondary slot are slots used for assembling a sight,
wherein the first attachment is a first sight, and the second attachment is a second sight, and
wherein the display code is further configured to cause the at least one processor to:
receive an aiming down sight operation, the aiming down sight operation being used for observing the virtual environment through the first sight in the primary slot and display the first interface according to the first sight, the first interface further comprising the virtual environment that is magnified according to a magnification of the first sight; and
display the second interface according to the second sight, the second interface further comprising the virtual environment that is magnified according to a magnification of the second sight.

18. A non-transitory computer readable storage medium storing computer-readable code, the computer-readable code, when executed by one or more processors, causes the one or more processors to:
display a first interface, the first interface comprising an image of a virtual environment observed by a virtual object, the virtual object holding a virtual gun, and a primary slot of the virtual gun being equipped with a first attachment;
receive an attachment switching operation; and
switch the first attachment in the primary slot to a second attachment in a secondary slot according to the attachment switching operation, the primary slot and the secondary slot being the same type of gun attachment slots of the virtual gun,
wherein the first attachment is identified by a first attachment identifier and the second attachment is identified by a second attachment identifier,
wherein each of the first attachment identifier and the second attachment identifier is represented by a first flag bit and a second flag bit indicating whether the virtual gun is assembled in the primary slot and the secondary slot, respectively, and
wherein the switching the first attachment in the primary slot to the second attachment in the secondary slot comprises modifying the first flag bit of the first attachment identifier to the second flag bit of the second attachment identifier.

* * * * *